United States Patent
Amidei et al.

(10) Patent No.: US 10,438,313 B2
(45) Date of Patent: Oct. 8, 2019

(54) SYSTEMS AND METHODS FOR STREAMING VIDEO GAMES USING GPU COMMAND STREAMS

(71) Applicant: DIVX, LLC, San Diego, CA (US)

(72) Inventors: William David Amidei, La Jolla, CA (US); Jason David Murray, San Diego, CA (US); Kevin Dean-Yong Wu, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 181 days.

(21) Appl. No.: 14/807,751

(22) Filed: Jul. 23, 2015

(65) Prior Publication Data

US 2016/0027143 A1 Jan. 28, 2016

Related U.S. Application Data

(60) Provisional application No. 62/028,243, filed on Jul. 23, 2014.

(51) Int. Cl.
*G06T 1/20* (2006.01)
*G06F 3/14* (2006.01)
(Continued)

(52) U.S. Cl.
CPC .............. *G06T 1/20* (2013.01); *A63F 13/30* (2014.09); *G06F 3/1454* (2013.01); *G06F 9/44* (2013.01);
(Continued)

(58) Field of Classification Search
CPC .... G06F 12/1408; G06F 21/44; G06F 13/122; G06F 15/7842; G06F 9/44; G06F 3/1454;
(Continued)

(56) References Cited

U.S. PATENT DOCUMENTS 7,830,388 B1    11/2010 Lu
2002/0136298 A1   9/2002 Anantharamu et al.
(Continued)

FOREIGN PATENT DOCUMENTS

IO     0072164 A1   11/2000
WO    2016014852    1/2016

OTHER PUBLICATIONS

International Preliminary Report on Patentability for International Application PCT/US2015/041828, Report dated Jan. 24, 2017, dated Feb. 2, 2017, 8 Pgs.
(Continued)

*Primary Examiner* — Yingchun He
(74) *Attorney, Agent, or Firm* — KPPB LLP

(57) ABSTRACT

Systems and methods for GPU command streaming in accordance with embodiments of the invention are disclosed. In one embodiment, a method for receiving and processing an encoded GPU command stream includes obtaining an encoded GPU command stream from at least one hosting server system using a rendering system, decoding the encoded GPU command stream into a decoded GPU command stream using the rendering system, obtaining a set of high density assets using the rendering system, mapping a first set of runtime generated identifiers to a second set of runtime generated identifiers using the rendering system so that the second set of runtime generated identifiers is correctly associated with the set of GPU commands, and producing a set of images using the rendering system by processing the decoded GPU command stream and the set of high density assets using a processor.

18 Claims, 11 Drawing Sheets

(51) Int. Cl.
*A63F 13/30* (2014.01)
*G06F 9/44* (2018.01)
*G09G 5/00* (2006.01)
*G06T 15/00* (2011.01)
*G09G 5/36* (2006.01)

(52) U.S. Cl.
CPC .......... G06T 15/005 (2013.01); G09G 5/001 (2013.01); G09G 5/363 (2013.01); *A63F 2300/538* (2013.01); *G06T 2200/16* (2013.01); *G09G 2340/02* (2013.01); *G09G 2360/08* (2013.01); *G09G 2370/022* (2013.01)

(58) Field of Classification Search
CPC . G06T 15/005; H04L 63/0876; H04N 7/0122; H04N 21/23424; H04N 21/234327; G09G 5/001; G06N 3/084
USPC ......................................................... 345/522
See application file for complete search history.

(56) References Cited

U.S. PATENT DOCUMENTS

| 2006/0026481 | A1* | 2/2006 | Monnerat | G01R 31/2825 714/741 |
| 2009/0267956 | A1 | 10/2009 | Greaves | |
| 2009/0278842 | A1 | 11/2009 | Peterfreund | |
| 2011/0157196 | A1* | 6/2011 | Nave | G06F 9/4445 345/522 |
| 2012/0127173 | A1 | 5/2012 | Elliott Swift | |
| 2012/0259994 | A1 | 10/2012 | Gillies et al. | |
| 2013/0036234 | A1 | 2/2013 | Pazos et al. | |
| 2013/0182842 | A1* | 7/2013 | Fasoli | H04N 21/2347 380/255 |
| 2013/0282917 | A1 | 10/2013 | Reznik et al. | |
| 2014/0013375 | A1 | 1/2014 | Giladi | |
| 2014/0089905 | A1* | 3/2014 | Hux | G06F 8/24 717/140 |
| 2014/0172964 | A1* | 6/2014 | Lyons | A63F 13/12 709/203 |
| 2014/0173674 | A1* | 6/2014 | Wolman | H04N 21/25 725/116 |
| 2014/0195651 | A1 | 7/2014 | Stockhammer et al. | |
| 2014/0333641 | A1* | 11/2014 | Dodge | G06T 9/00 345/522 |

OTHER PUBLICATIONS

International Search Report and Written Opinion for International Application No. PCT/US2015/041828, Search completed Sep. 8, 2015, dated Oct. 23, 2015, 9 Pgs.

\* cited by examiner

SYSTEMS AND METHODS FOR STREAMING VIDEO GAMES USING GPU COMMAND STREAMS

CROSS-REFERENCE TO RELATED APPLICATIONS

This application claims the benefit of and priority under 35 U.S.C. § 119(e) to U.S. Provisional Application No. 62/028,243, entitled "Streaming Video Games Using GPU Command Streams," filed on Jul. 23, 2014, which is incorporated herein by reference in its entirety for all purposes.

FIELD OF THE INVENTION

The present invention generally relates to streaming video content and more specifically to the streaming of video game content.

BACKGROUND

Competitive gaming (eSports) is a rapidly developing industry. The viewing of others playing video games or competing in video game tournaments is also quickly becoming a pastime among the video gaming community. These viewings can be categorized into either in person, live video game streaming, or video on demand (VOD). Most live video game streaming and video game VOD services utilize video streaming systems similar to those utilized within traditional video streaming services.

Video streaming refers to the process of delivering video content to viewers. As an alternative to traditional downloading, video streaming allows the viewers to start watching the video without the need to download an entire piece of content. During video streaming, video content stored on a server is continuously sent to a viewer's playback device over a network during playback. Typically, the playback device stores a sufficient quantity of video content in a buffer at any given time during playback to prevent disruption of playback due to the playback device completing playback of all the buffered video content prior to receipt of the next portion of video content.

Video streaming solutions typically utilize either Hypertext Transfer Protocol (HTTP), published by the Internet Engineering Task Force and the World Wide Web Consortium as RFC 2540, or Real Time Streaming Protocol (RTSP), published by the Internet Engineering Task Force as RFC 2326, to stream video content between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device. RTSP is a network control protocol used to control streaming media servers. Playback devices issue control commands, such as (but not limited to) "play" and "pause", to the server streaming the media to control the playback of media files. When RTSP is utilized, the media server records the state of each client device and determines the media to stream based upon the instructions received from the client devices and the client's state. Adaptive bit rate streaming or adaptive streaming involves detecting the present streaming conditions (e.g. the user's network bandwidth and CPU capacity) in real time and adjusting the quality of the streamed media accordingly. Typically, the source media is encoded at multiple bit rates and the playback device or client switches between streaming the different encodings depending on available resources.

Video game streams are typically encoded and transmitted using similar techniques employed for the streaming of other types of video content. Specifically, the video content can be encoded in accordance with the H.264/MPEG-4 AVC standard, developed by ITU-T Video Coding Experts Group (VCEG) together with the ISO/IEC JTC1 Moving Picture Experts Group (MPEG), and placed in a media container (MP4, MKV, AVI, and so on). Nevertheless, video streaming and video game streaming differ in several aspects. In traditional video streaming systems, the video content is a set of images typically captured by a camera. On the other hand, video content from video game streams are typically produced by a video game system, such as (but not limited to) a personal computer or video game console system.

Modern video games typically utilize two-dimensional or three-dimensional graphics. Rendering these computer graphics can require considerable computing power. Graphical processing units (GPUs) or central processing units (CPUs) can be used to provide additional graphical computational power to render videos from game applications. Rendering videos from game applications typically includes taking geometric, light, color, and/or positional information from the game applications to create a set of images. The images can be displayed at a predetermined frame rate (i.e. frames per second (fps)). The images can also be encoded for streaming. A playback device can download and decode the encoded images. The playback device can display the decoded images at the predetermined frame rate to generate a video sequence.

A technique for streaming video game content is illustrated in FIG. 1. The streaming system 100 can include a streaming source system 102, which is typically the video gamer's computer system. The streaming source system 102 can include a game application 104 that sends GPU commands to a GPU 106. The GPU 106 can process the GPU commands to render images, which can be simultaneously displayed onto the streaming source system display 108 and encoded by a video encoder 110. In some streaming systems, the images can be encoded by a video encoder in a system separate from the streaming source system. The encoded images can be sent over a network 112 and stored on a server 114. The viewer's playback device 116 continuously streams the video content from the hosting server 114 and processes the video content through a rendering engine application 118. The rendering engine application 118 uses a video decoder 120 to decode the encoded images and displays the rendered images through a display 122.

SUMMARY OF THE INVENTION

Systems and methods for GPU command streaming in accordance with embodiments of the invention are disclosed. A novel approach can be used to reduce the file size needed to be transmitted compared to traditional methods. The new approach allows for reduced upload requirements for publishers to stream high quality video content and reduced network bandwidth requirements for viewers to stream the video content without pauses.

In one embodiment, a method for receiving and processing an encoded GPU command stream, the method includes obtaining an encoded GPU command stream from at least one hosting server system using a rendering system, decoding the encoded GPU command stream into a decoded GPU command stream using the rendering system, the decoded GPU command stream includes a first set of runtime generated identifiers, obtaining a set of high density assets using the rendering system, mapping the first set of runtime generated identifiers to a second set of runtime generated identifiers using the rendering system so that the second set of runtime generated identifiers is correctly associated with the set of GPU commands, and producing a set of images using the rendering system by processing the decoded GPU command stream and the set of high density assets using a processor.

In a further embodiment, processing the decoded GPU command stream and the set of high density assets using a processor includes modifying the decoded GPU command stream by identifying a subset of the set of GPU commands that are incompatible with the processor, and altering the subset of the set of GPU commands so that the subset of the set of GPU commands are compatible with the processor.

In another embodiment, the processor includes a GPU.

In a still further embodiment, decoding the encoded GPU command stream into a decoded GPU command stream using the rendering system includes decompressing the encoded GPU command stream, and deserializing the decompressed encoded GPU command stream.

In still another embodiment, the decoded GPU command stream further includes hashes of high density assets, and obtaining a set of high density assets using the rendering system includes using the hashes to obtain the set of high density assets from at least one hosting server system.

In a yet further embodiment, the decoded GPU command stream further includes stream metadata, and the method further includes altering the decoded GPU command stream using the rendering system by receiving a user input, and modifying the rendering of the set of images based upon the stream metadata in response to the user input.

In yet another embodiment, the decoded GPU command stream further includes hashes of high density assets, and obtaining a set of high density assets using the rendering system includes determining a first subset of the set of high density assets exists in a local database by using the hashes to perform a lookup, obtaining the first subset of the set of high density assets from the local database, and using the hashes to obtain a second subset of the set of high density assets from at least one hosting server system.

In a further additional embodiment, the method further includes receiving a user input requesting a new playback location using the rendering system, obtaining a set of new state information using the rendering system, where the set of new state information is obtained based upon the new playback location, and updating the processor with the set of new state information using the rendering system.

In another additional embodiment, a method for encoding and transmitting a GPU command stream, the method includes intercepting GPU outputs from a GPU using a streaming source system, the GPU outputs includes GPU commands and high density assets produced by a streaming source system hashing the high density assets using the streaming source system by using a hashing function, the hashing producing hashes of the high density assets, transmitting high density assets to at least one hosting server system using the streaming source system, encoding the hashes of the high density assets and a subset of the GPU outputs into an encoded GPU command stream using the streaming source system, and transmitting the encoded GPU command stream to the at least one hosting server system using the streaming source system.

In a further embodiment again, encoding the hashes of the high density assets and a subset of the GPU outputs into an encoded GPU command stream using the streaming source system includes serializing the hashes of the high density assets and the subset of the GPU outputs, and compressing the serialized hashes of the high density assets and subset of the GPU outputs.

In another embodiment again, a rendering system for receiving and processing a GPU command stream, the rendering system includes a set of processors, memory containing a rendering engine application, a network interface, an input device, wherein the rendering engine application directs a set of processors to obtain an encoded GPU command stream from at least one hosting server system using the network interface, decode the encoded GPU command stream into a decoded GPU command stream, the decoded GPU command stream includes a first set of runtime generated identifiers, obtain a set of high density assets using the network interface, map the first set of runtime generated identifiers to a second set of runtime generated identifiers so that the second set of runtime generated identifiers is correctly associated with the set of GPU commands, and produce a set of images by processing the decoded GPU command stream and the set of high density assets using the set of processors.

In a still yet further embodiment, processing the decoded GPU command stream and the set of high density assets using the set of processors includes modifying the decoded GPU command stream by identifying a subset of the set of GPU commands that are incompatible with the second subset of the set of processors, and altering the subset of the set of GPU commands so that the subset of the set of GPU commands are compatible with the second subset of the set of processors.

In still yet another embodiment, the set of processors includes a GPU.

In a still further additional embodiment, decoding the encoded GPU command stream into a decoded GPU command stream includes decompressing the encoded GPU command stream, and deserializing the decompressed encoded GPU command stream.

In still another additional embodiment, the decoded GPU command stream further includes hashes of high density assets, and obtaining a set of high density assets using the network interface includes using the hashes to obtain the set of high density assets from at least one hosting server system.

In a still further embodiment again, the decoded GPU command stream further includes stream metadata, and the rendering engine application further directs the set of processors to alter the decoded GPU command stream by receiving a user input, and modifying the rendering of the set of images based upon stream metadata in response to the user input.

In still another embodiment again, the decoded GPU command stream further includes hashes of high density assets, and obtaining a set of high density assets using the network interface includes determining a first subset of the set of high density assets exists in a local database by using the hashes to perform a lookup, obtaining the first subset of the set of high density assets from the local database, and using the hashes to obtain a second subset of the set of high density assets from at least one hosting server system.

In a yet further additional embodiment, the rendering engine application further directs the set of processors to receive a user input requesting a new playback location using the input device, obtain a set of new state information using the network interface, where the set of new state information is obtained based upon the new playback location, and update the second subset of the set of processors with the set of new state information.

In yet another additional embodiment, a streaming source system for encoding and transmitting a GPU command stream, the streaming source system includes a set of processors, memory containing a streaming application, a network interface, wherein the streaming application directs a set of processors to intercept GPU outputs from a GPU, the GPU outputs includes GPU commands and high density assets produced by a streaming source system, hash the high density assets using a hashing function, the hashing producing hashes of the high density assets, transmit high density assets to at least one hosting server system using the network interface, encode the hashes of the high density assets and a subset of the GPU outputs into an encoded GPU command stream, and transmit the encoded GPU command stream to the at least one hosting server system using the network interface.

In a yet further embodiment again, encoding the hashes of the high density assets and a subset of the GPU outputs into an encoded GPU command stream includes serializing the hashes of the high density assets and the subset of the GPU outputs, and compressing the serialized hashes of the high density assets and subset of the GPU outputs.

DETAILED DISCLOSURE OF THE INVENTION

Figure 1:
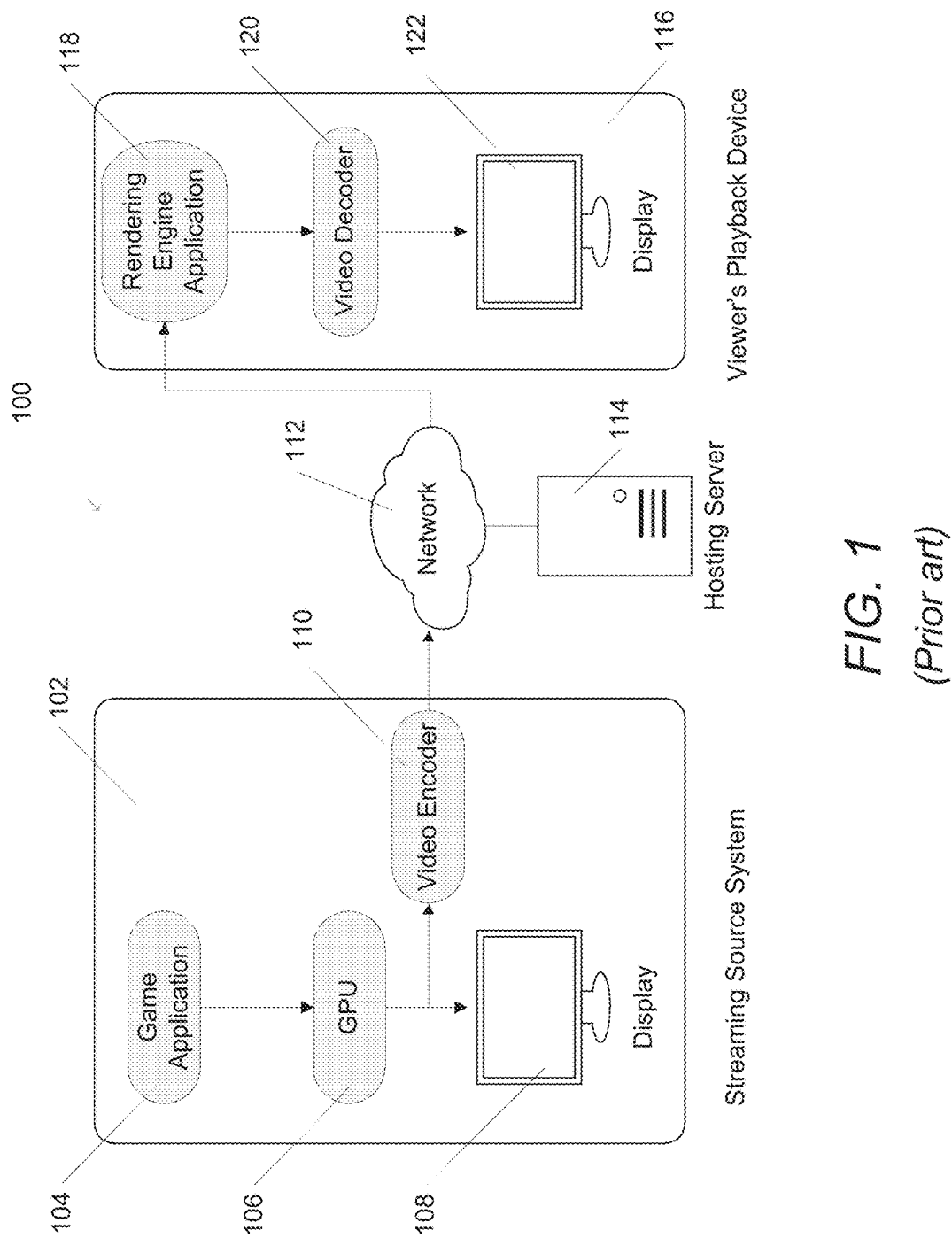
FIG. 1 is a conceptual illustration of a prior art video game streaming system.

Turning now to the drawings, systems and methods for streaming video games using GPU command streams are illustrated. Publishers of video game streams are often video gamers who live stream their current playing of a video game. Video gamers can interact with viewers either through a webcam or messaging system. With the real time and interactive nature of a video game live stream, the stream is ideally uploaded by the publisher and downloaded by the viewers at low latency. The trend of continuously increasing video resolution has led to an increase in file sizes for digital video content. Consequently, high upload and network bandwidths can be important for maintaining a high quality stream. Publishers with sub-optimal systems and/or network bandwidths are typically unable to upload their desired video quality at a sufficient speed. In addition, viewers with sub-optimal network bandwidths can be forced to wait for video data to preload, or buffer, before video playback can commence or resume.

As discussed above, video game streams can be encoded and transmitted the same way as most other video streams. Specifically, encoded renderings of images can be streamed to a viewer's playback device. In video games, images are typically rendered by the GPU and/or CPU using GPU commands sent from a game application. In many embodiments of the invention, GPU commands can be intercepted and transmitted instead of the rendered images. The GPU commands along with any other information transmitted can be referred to as a GPU command stream. In several embodiments, the GPU command stream transmission can use a distribution system that includes a streaming source system transmitting a GPU command stream over a network to a hosting server. The GPU command stream can be downloaded by a rendering system. In many embodiments, the rendering system can be the viewers' playback device. In other embodiments, the rendering system is an intermediate server that processes the GPU command stream. The rendering system receiving the GPU commands can then process the GPU commands using the render system GPU and/or CPU to render the images for display, encoding and/or further transmission. The transmission of GPU commands as an alternative to or in combination with rendered images can allow for transmission of a video game stream with reduced upload requirements.

In order to transmit the GPU command stream efficiently, the GPU commands can be encoded in accordance with a specification understood by both the streaming source system and the rendering system. In many embodiments, encoding GPU command streams can include serializing and/or compressing the GPU command streams. The serialization specification can be any method of serializing data. The GPU command stream can also be compressed to reduce the amount of data transmitted. Although any method of data compression can be used, several methods can yield relatively higher compression ratios due to the nature of GPU command streaming.

GPUs utilized within the streaming source systems and the rendering systems can differ greatly in manufacturers and/or model numbers. These differences can affect the GPU command stream's interoperability between the streaming source system and the rendering system. One problem is that many of the GPU commands reference GPU runtime generated identifiers (identifiers). These identifiers are typically generated as the result of one GPU command and then referred to with subsequent commands. Software solutions can be used to map the streaming source system GPU-generated identifier to a rendering system GPU-generated identifier. An additional problem is that there may be some mismatch in the set of GPU commands supported by a rendering system GPU and the GPU commands sent from the streaming source system. A hybrid software/hardware (SW/HW) implementation can be used to increase the likelihood that all of the GPU commands are supported by the rendering system even if the rendering system GPU does not support the complete set of the streaming source system GPU commands.

A characteristic of video game streams is that, from stream to stream, there is a significant amount of shared data. This data, or high-density assets (HDAs), can be separated from each specific stream and transferred once to a rendering system. HDAs can include vertex arrays, bitmaps, shaders, and/or other things. The rendering system can save and reuse this data from stream to stream. This allows significant bandwidth savings for the transmission of each specific stream. Also, by providing different versions of HDAs and/or stream metadata that allows user interactions, GPU command streams can be manipulated within the rendering system. Stream metadata can include references or identifiers which identify information and their associated "meaning". This information can include specific points, matrices, shaders, bitmaps, other HDAs, and/or other things. Traditional video streams are static entities that only allow for decoding and display. However, with GPU command streaming, camera angles, lighting effects, graphics quality details, and/or other things can be controlled by utilizing stream metadata and/or different versions of HDAs. By sending different HDAs, graphics quality detail can be altered to produce a rendered video with different graphics quality compared to the video produced by the streaming source system. In cases where the rendering system is an intermediate rendering server, a streaming source system GPU command stream can produce a video of high quality, and viewers with poor network bandwidth might not be able to effectively retrieve such a high quality stream produced from the intermediate server. In many embodiments, by sending different HDAs, intermediate servers can prepare varying levels of video quality for viewers to stream. In other embodiments, the intermediate servers can prepare varying levels of video quality for viewers by processing the received GPU commands into images and encoding the rendered images at different resolutions and/or maximum bitrates. In cases where the rendering system is a playback device, the playback device can utilize the different HDAs to produce new GPU commands that can result in rendered images of lower resolutions.

Video game streams, like other video streams, can benefit from the ability to provide viewers with random access to playback locations within the video game stream. Random access refers to a viewer's ability to dynamically choose which point of the stream to watch, allowing a playback device to commence playback of a video stream at any point and perform functions including (but not limited to) jumping forward or backward in time during playback and/or performing so called "trick play" functionality such as (but not limited to) fast forward and rewind. By periodically capturing and transmitting GPU state information, the viewers can request and receive GPU state information near a requested random access point. This allows for random access functionality in the playback of a GPU command streaming system. State information can include shaders, buffer arrays, vertex arrays, and/or anything that gets loaded into the GPU and the associated identifiers.

The encoding and/or streaming of GPU commands and related information in accordance with various embodiments of the invention are discussed in additional detail below.

GPU Command Streaming System Architectures

Figure 2:
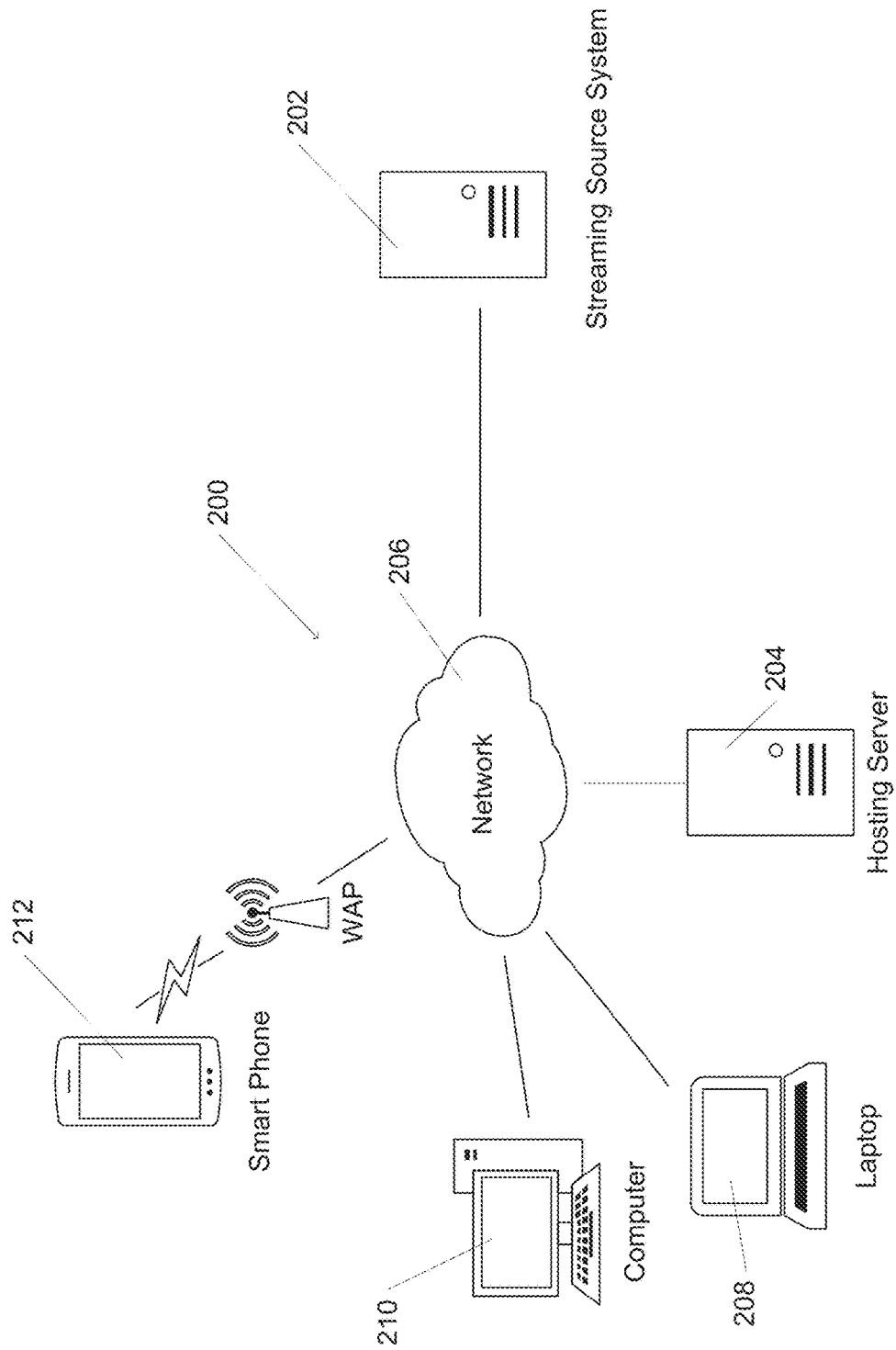
FIG. 2 is a network diagram of a GPU command streaming system in accordance with an embodiment of the invention.

GPU command streaming systems in accordance with various embodiments of the invention distribute GPU command streams to one or more rendering systems. In many embodiments, the GPU command stream transmission can use a distribution system that includes a streaming source system transmitting a GPU command stream over a network to a hosting server. A GPU command streaming system that utilizes GPU command streams in accordance with an embodiment of the invention is illustrated in FIG. 2. The GPU command streaming system 200 includes a streaming source system 202 connected to a hosting server 204 through a network 206. The streaming source system 202 can encode GPU commands and send encoded commands to the hosting server 204. In many embodiments, the streaming source system 202 and/or the hosting server 204 can be implemented using a single computing device. In other embodiments, the streaming source system 202 and/or the hosting server 204 can be implemented using a plurality of computing devices. The hosting server 204 can store a GPU command stream and transmit the GPU command stream to one or more rendering systems requesting the GPU command stream. In the illustrated embodiment, the rendering systems are playback devices. In other embodiments, the rendering systems can include a set of intermediate servers. In several embodiments, the playback devices have local memory storage. In the illustrated embodiment, playback devices include laptops 206, personal computers 208, and smart phones 210. In other embodiments, playback devices can include video game consoles, tablets, or other devices capable of connecting to a server and processing a GPU command stream for rendering and playback of a video sequence.

Although a specific architecture is shown in FIG. 2, any of a variety of architectures that enable rendering systems to request portions of the encoded GPU commands, including those with playback devices in peer-to-peer (P2P) communication with a source encoding server and/or other viewers' systems, can be utilized in accordance with embodiments of the invention.

In traditional video streaming systems, rendered videos are encoded and transmitted. GPU command streaming can involve the encoding of GPU commands. Typically, these GPU commands are produced by game applications executing on a source rendering system and are sent to a set of processing units. In many embodiments, the set of processing units includes a GPU. In several embodiments, the set of processing units includes a CPU. Before the GPU commands are sent to the set of processing units, they can be intercepted, encoded, and streamed.

Figure 3:
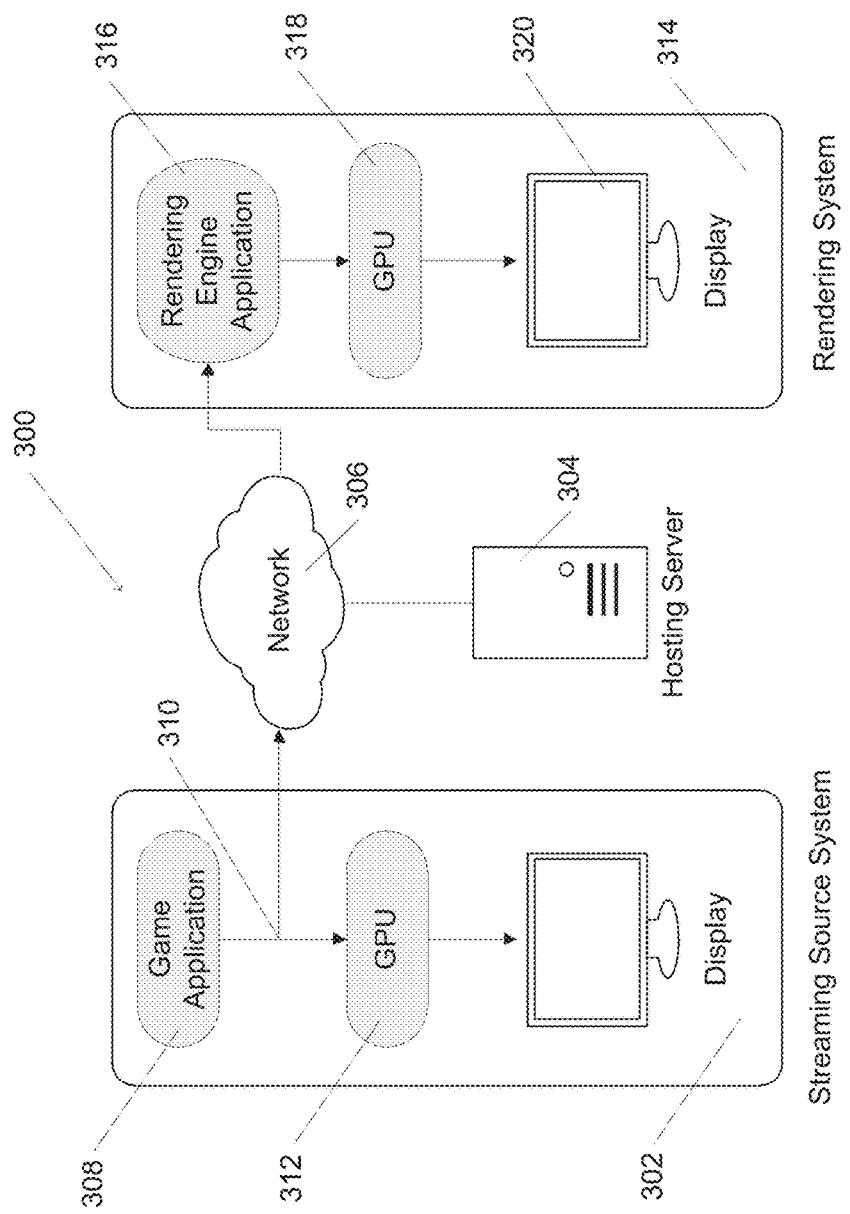
FIG. 3 is a conceptual illustration of a GPU command streaming system in accordance with an embodiment of the invention.

A conceptual illustration of a GPU command streaming system in accordance with an embodiment of the invention is illustrated in FIG. 3. The system 300 can include a streaming source system 302 transmitting a GPU command stream to a hosting server 304 over a network 306. The GPU command stream can include GPU commands produced from a game application 308 that are intercepted 310 before they are sent to the streaming source GPU 312. A rendering system 314 can request and download a GPU command stream from a hosting server 304 over the network 306. In the illustrated embodiment, the rendering system 314 forms part of a viewer's playback device. The GPU command stream can be sent through a rendering engine application 316 executing on the rendering system to the rendering system GPU 318 to render the images, which can then be displayed on a display 320.

In the illustrated embodiment, the encoded GPU commands are sent to a hosting server from which a rendering system can request and download the stream. In many embodiments, the encoded GPU commands can be sent to an intermediate server that acts as a rendering system. An intermediate server can process the encoded GPU commands to render sequences of images, which can then be encoded into one or more encoded video streams that can be streamed by a viewer's playback device and decoded using a conventional video decoder.

Although a specific system is shown in FIG. 3, any of a variety of systems that includes streaming intercepted GPU commands, including systems that utilize direct P2P communication between the streaming source system and the rendering system, can be utilized in accordance with embodiments of the invention.

Encoding GPU Command Streams

In many embodiments, transmitting and storing a GPU command stream to a hosting server or rendering system includes serializing the data into a storable format. A GPU command stream serialized by a streaming source system can be interpreted by the rendering system to achieve playback. In several embodiments, a specific encoding specification known by both systems is utilized. The specified format can use any of a number of encoding techniques for serializing data. In many embodiments, protocol buffers, developed by Google, Inc. of Mountain View, Calif., can be used to serialize the GPU command stream. In several embodiments, Extensible Markup Language (XML) is used to serialize the GPU command stream. As can readily be appreciated, the specific manner in which the GPU command stream is serialized is largely dictated by the requirements of a specific application.

In many embodiments, the GPU command stream can be compressed. Compression of GPU command streams can be significantly different from the compression of typical video streams. In traditional video media, each frame in the video contains an array of pixels. The attributes of these pixels, such as (but not limited to) color and intensity, can vary from frame to frame. Although video compression can be lossless, they are typically lossy to achieve bandwidth savings. In the context of video games, a lossless recovery of every frame of a video can be achieved with the starting GPU state and the set of GPU commands that created the video.

In many embodiments, a streaming application directs a streaming source system to perform the serialization and compression. While any of a number of compression methods can be used, including lossy compression methods, many embodiments utilize entropy encoding to achieve significant data size reduction. Once an image is rendered by the GPU, successive images can contain much repeated information and the GPU commands to render the images can often be repeated or similar to each other. After information such as (but not limited to) vertex buffer objects (VBOs), textures, shaders, and/or bitmaps are transferred to the GPU, the commands to render images are often very regular and/or repeated. Also, a GPU can render successive images with significant changes from the previous images using small changes to the GPU commands. The geometry, optics, and physics involved with computer graphics can be very formulaic in nature. Changes such as (but not limited to) simple modifications to a transformation matrix can result in entirely different frames.

Figure 4:
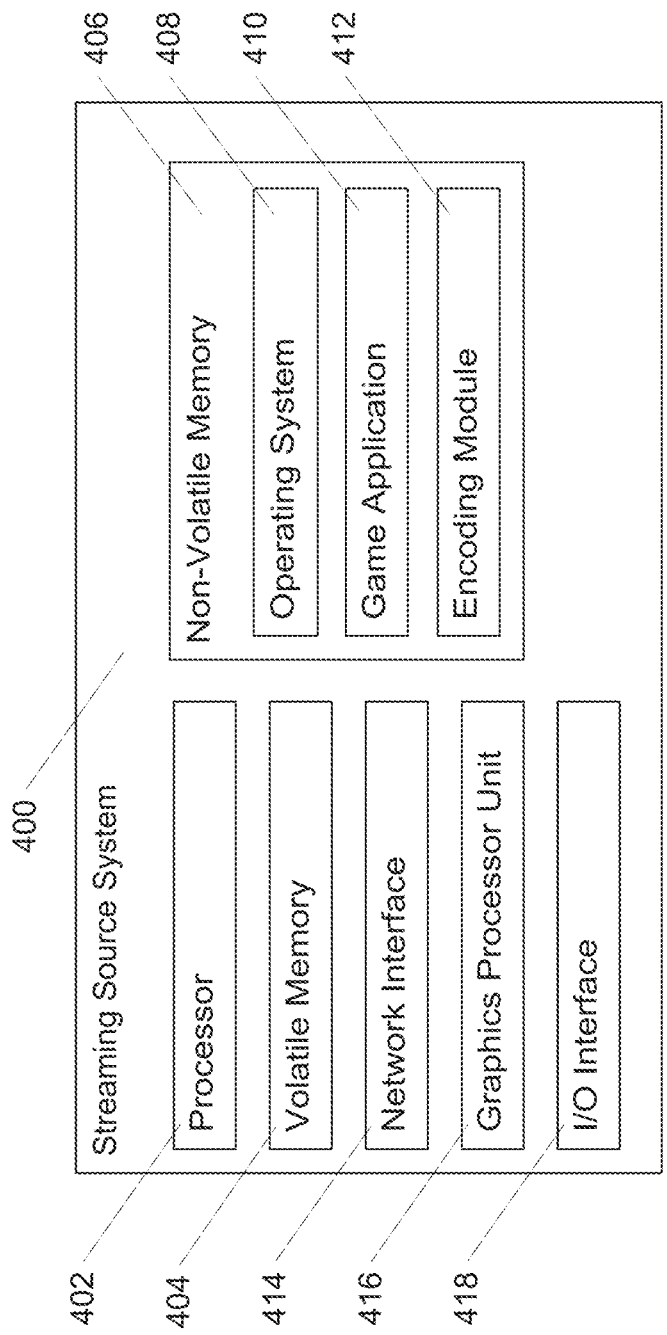
FIG. 4 is a conceptual illustration of a streaming source system for encoding and transmitting a GPU command stream in accordance with an embodiment of the invention.

A conceptual illustration of a streaming source system capable serializing and compressing a GPU command stream in accordance with an embodiment of the invention is shown in FIG. 4. The streaming source system 400 can include a processor 402 in communication with volatile memory 404 and non-volatile memory 406. In the illustrated embodiment, the non-volatile memory 406 includes an operating system 408, a game application 410, and an encoding module 412. In many embodiments, the operating system 408, the game application 410, and/or the encoding module 412 can be stored using the volatile memory 404. The streaming source system 400 can include a network interface 414 that enables the streaming source system 400 to send and receive data over a network connection. The streaming source system 400 can also include a GPU 416 and an input/output (I/O) interface 418.

In many embodiments, the GPU 416 can process data from the game application 410 into images. In several embodiments, the processor 402 can process the data from the game application 410 into images. The I/O interface 418 can be used to display the rendered images. In some embodiments, before the data is sent to the GPU 416, the processor 402 can also direct the data to the encoding module 412 to be encoded. In many embodiments, the encoding module includes a serialization module and/or a compression module. In various embodiments, the encoded data can then be sent and stored on a remote server. In a number of embodiments, the encoded data can be sent to the rendering system.

Although a specific architecture for a streaming source system is conceptually illustrated in FIG. 4, any of a variety of architectures, including those which store data or applications on disk or some other form of storage and are loaded into volatile memory at runtime, and/or systems that are distributed across multiple physical servers, can also be utilized in accordance with an embodiment of the invention.

Figure 5:
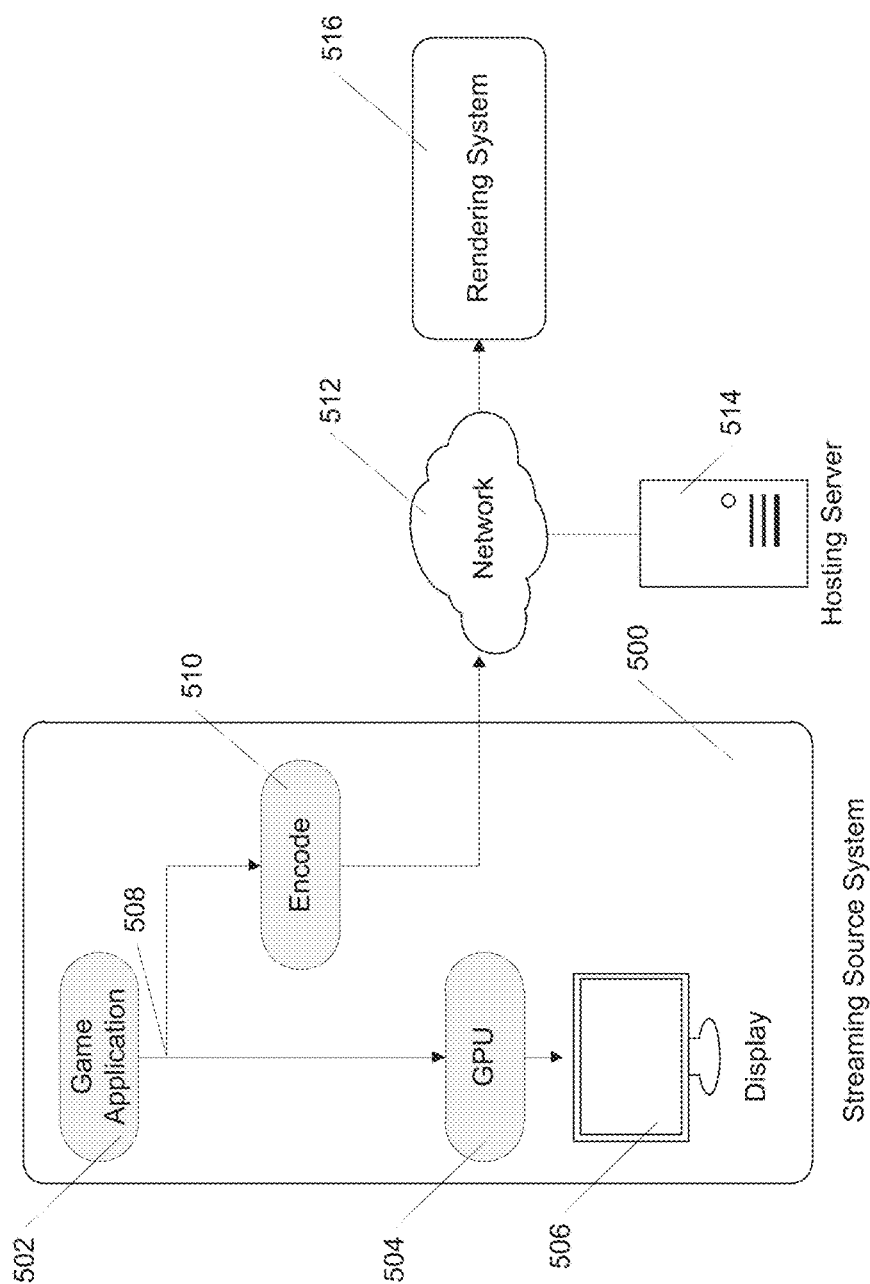
FIG. 5 is a conceptual illustration of a GPU command streaming system that utilizes encoded GPU commands in accordance with an embodiment of the invention.

FIG. 5 visually illustrates the flow of GPU commands throughout the streaming source system in accordance with an embodiment of the invention. In the illustrated embodiment, the streaming source system 500 can include a game application 502, a GPU 504, and a display 506. The game application 502 can send GPU commands to the GPU 504 for processing. The GPU 504 can process the GPU commands into images which can then be displayed on the display 506. Before the commands are sent to the GPU, they can be intercepted 508. The intercepted GPU commands can be encoded 510 into an encoded GPU command stream. The encoded GPU command stream can be sent over a network 512 to be stored on a hosting server 514. A rendering system 516 can request and download the stored encoded GPU command stream. In many embodiments, the encoded GPU command stream can be sent over the network 512 to an intermediate server which acts as the rendering system 516.

Although a specific system for encoding a GPU command stream is conceptually illustrated in FIG. 5, any of a variety of systems, including those which do not include a hosting server, can also be utilized in accordance with an embodiment of the invention.

Interoperability

In several embodiments, the GPU models among streaming source systems and rendering systems can differ. This can introduce interoperability issues. Moreover, a GPU processing GPU commands meant for a different GPU can also introduce several interoperability issues. One possible issue is that GPU commands can reference GPU runtime generated identifiers. These identifiers can be generated when a GPU command is referred to by subsequent GPU commands. As the streaming source system GPU and rendering system GPU are typically separated by time and location, these identifiers cannot be resolved directly in the stream. Software can be provided to the rendering system to map the streaming source system GPU-generated identifiers to the rendering system GPU-generated identifiers. In some embodiments, the identifiers can be mapped to a standard format before they are obtained by a rendering system. The rendering system can then map the identifiers to the rendering system GPU runtime generated identifiers.

Another issue is that differing models of GPUs can support different sets of GPU commands. In cases where the rendering system is part of a viewer's playback device, the GPU model of the rendering system will likely differ from the streaming source system. The GPU command set produced by the streaming source system will likely not be completely supported by the rendering systems. The GPU commands supported by the rendering system GPU command set can be processed by the rendering system GPU normally. The GPU commands that are not supported by the rendering system GPU command set can be modified by software into a set of equivalent GPU commands that is compatible with the GPU command set supported by the rendering system GPU.

Figure 6:
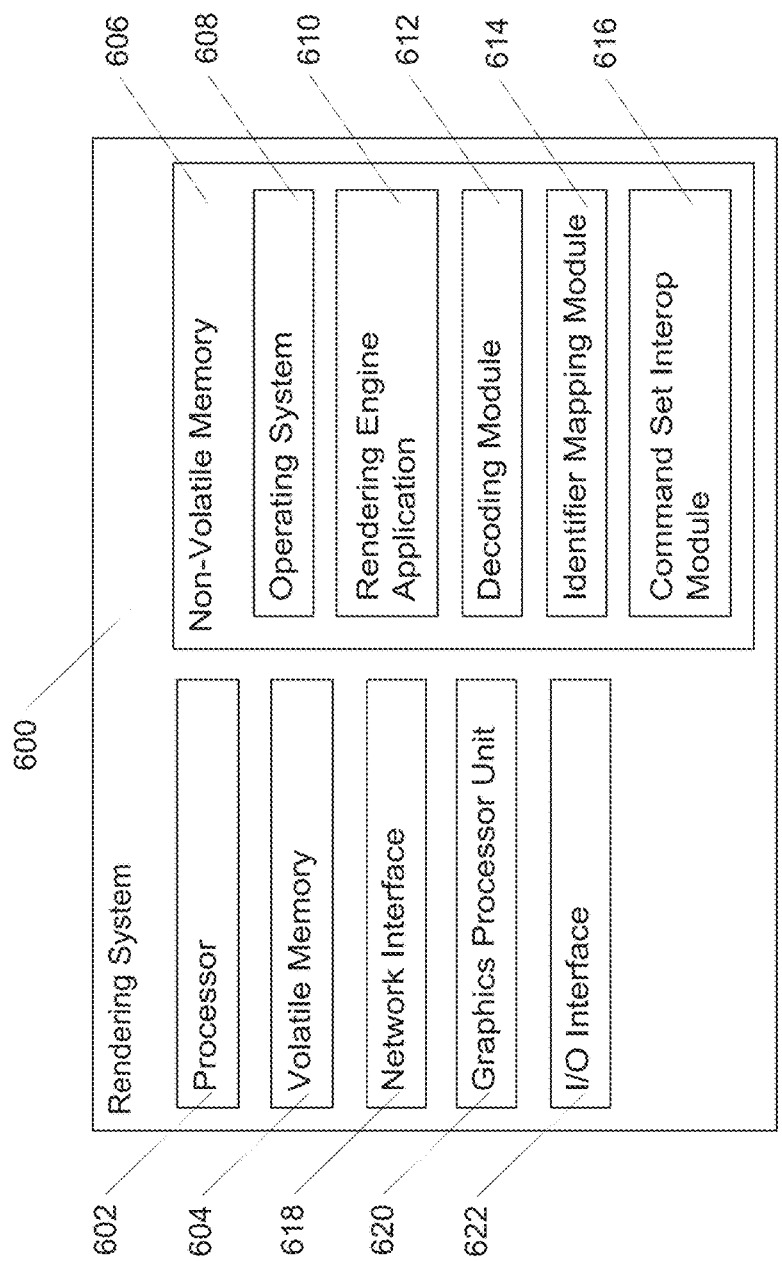
FIG. 6 is a conceptual illustration of a rendering system for receiving and processing a GPU command stream in accordance with an embodiment of the invention.

A conceptual illustration of a rendering system capable of the aforementioned interoperability scheme in accordance with an embodiment of the invention is shown in FIG. 6. The rendering system 600 can include a processor 602 in communication with volatile memory 604 and non-volatile memory 606. In the illustrated embodiment, the non-volatile memory can include an operating system 608, a rendering engine application 610, a decoding module 612, an identifier mapping module 614, and a command set interoperability module 616. In many embodiments, the operating system 608, the rendering engine application 610, the decoding module 612, the identifier mapping module 614, and/or the command set interoperability module 616 can be stored using the volatile memory 604.

The rendering system 600 can include a network interface 618 that enables the rendering system 600 to send and receive data over a network connection. The rendering system 600 can also include a GPU 620 and an I/O interface 622. The rendering engine application can use the network interface 618 to receive an encoded GPU command stream and store it in either volatile memory 604 or non-volatile memory 606. The rendering engine application 610 can direct the encoded GPU command stream through the decoding module 612 to decode the GPU command stream. The rendering engine application 610 can then direct the decoded GPU command stream to the GPU 620 to be processed. In many embodiments, the rendering engine application 610 can direct the decoded GPU command stream to the processor 602 to be processed. In several embodiments, the rendering engine application 610 can use the identifier mapping module 614 to map the GPU command stream identifiers to the GPU 620 identifiers to help achieve interoperability. GPU commands from the decoded GPU command stream that are not supported by the GPU 620 and/or processor 602 can be modified by the command set interoperability module 616 to be compatible. The modified/compatible GPU commands can be processed by the GPU 620 and/or processor 602 into images and displayed through the I/O interface 622.

Although a specific architecture for a rendering system is conceptually illustrated in FIG. 6, any of a variety of architectures, including those which do not contain a command set interoperability module, can also be utilized in accordance with an embodiment of the invention.

High-Density Assets

Video game streams can contain certain HDAs, such as (but not limited to) VBOs, textures, bitmaps, and/or shaders, that are similar or identical from stream to stream. HDAs can be separated from the GPU command stream and can be transmitted only once to the rendering system. This in-turn allows for a decrease in the streaming source system's average upload bandwidth requirements and the rendering system's average download bandwidth as well as distribution provider's storage and transmission bandwidth/cost. In some embodiments, the HDAs are not separated from the GPU command stream and are a part of the GPU command stream. In many embodiments, a separate storage and distribution system can be used to stream HDAs. In various embodiments, the hosting server is the same server as the hosting server of the GPU command stream. In several embodiments, HDAs are sent to the rendering system. The rendering system can download new HDAs and save them to the rendering system's local database for use in later streams. By decoupling the storage and transfer of HDAs, the rendering system can request and download an HDA when processing of the current GPU command stream requires an HDA that is missing from the rendering system's local database. For each type of reusable HDA, the streaming source system can hash the data and include only the hashes in the GPU command stream. Separately, the streaming source system can check and populate a database of HDAs. The rendering system can then receive the hash of the HDA in the GPU command stream which it can then use to retrieve the HDA from the database of HDAs or from its local database of previously retrieved HDA. In many embodiments, the distribution of these HDAs to a rendering system can be accomplished using a content delivery network (CDN). In various embodiments, the distribution of these HDAs to a rendering system can be accomplished using a P2P network.

Figure 7:
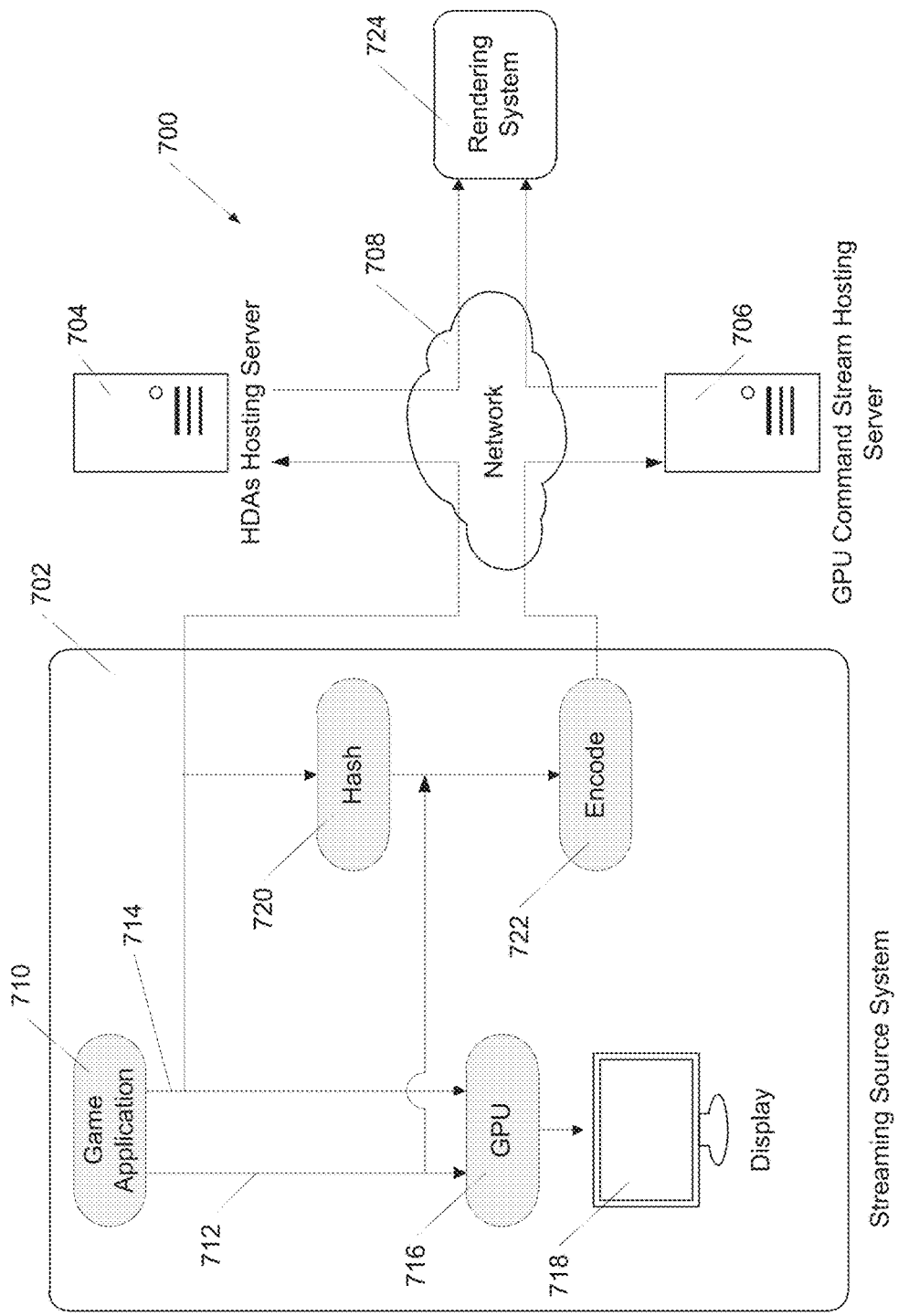
FIG. 7 is a conceptual illustration of a system of decoupling high-density assets from the GPU command stream in accordance with an embodiment of the invention.

FIG. 7 visually illustrates the flow of HDAs and GPU commands within a streaming source system in accordance with an embodiment of the invention. The system 700 can include a streaming source system 702 in communication with an HDA hosting server 704 and a GPU command stream hosting server 706 over a network 708. The streaming source system 702 can include a game application 710 transmitting GPU commands 712 and HDA 714 to a GPU 716 which can process and render the information into images to be displayed on a display 718. Before the HDAs 712 are sent to the GPU 716, they can be intercepted and a hash function 720 can be applied to the HDAs. Concurrently, the HDAs 714 can be sent over a network 708 to an HDA hosting server 704. The GPU commands 712 can also be intercepted before they are sent to the GPU 716. The hashes of the HDAs and the GPU commands 712 can be encoded 722 into an encoded GPU command stream. The encoded GPU command stream can be sent over a network 708 to the GPU command stream hosting server 706. In many embodiments, the HDA hosting server 704 and GPU command stream hosting server 706 can be the same server. In several embodiments, the HDA hosting server 704 and/or GPU command stream hosting server 706 can be implemented using a single server. In various embodiments, the HDA hosting server 704 and GPU command stream hosting server 706 can be implemented using a plurality of servers. The uploaded files can then be requested and streamed by a rendering system 724.

Although a specific system for decoupling and transferring HDAs is conceptually illustrated in FIG. 7, any of a variety of systems, including those which the HDAs and/or GPU commands are sent to a rendering system, can also be utilized in accordance with an embodiment of the invention.

Figure 8:
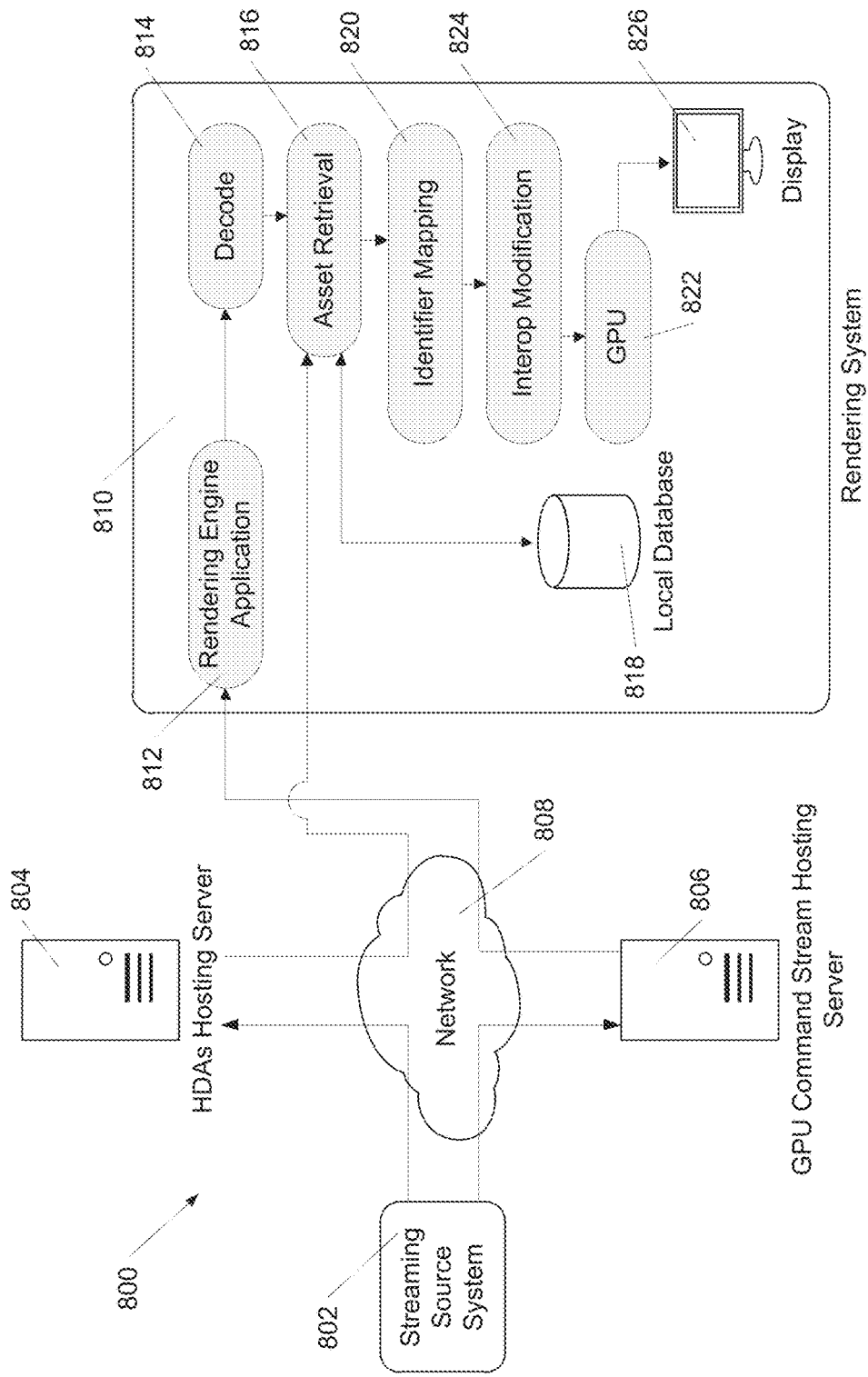
FIG. 8 is a conceptual illustration of a rendering system receiving and processing a GPU command stream in combination with retrieving high-density assets in accordance with an embodiment of the invention.

FIG. 8 visually illustrates the flow of HDAs and GPU commands within a rendering system in accordance with an embodiment of the invention. The system 800 can include a streaming source system 802 transmitting HDAs to an HDA hosting server 804 and transmitting an encoded GPU command stream to a GPU command stream hosting server 806 over a network 808. A rendering system 810 can request and receive an encoded GPU command stream from the GPU command stream hosting server 806. The encoded GPU command stream can be processed by a rendering engine application 812. The rendering engine application 812 can use a decoding module to decode 814 the encoded GPU command stream. In many embodiments, the decoded GPU command can contain hashes of HDAs that are needed to render the correct images. Using the hashes, the rendering system can retrieve 816 the required HDAs from the GPU command stream hosting server 806 and/or, if the rendering system 810 has previously downloaded the HDA, a local database 818. The GPU commands from the decoded GPU command stream can contain identifiers that are generated from the streaming source system GPU. These identifiers can be mapped 820 to the rendering system GPU 822 generated identifiers using a software module. The decoded GPU commands can contain commands not supported by the rendering system GPU 822. For these commands, a software module can modify 824 the unsupported GPU commands to ones that are supported by the GPU 822. In this way, the decoded/modified GPU command stream can be processed by the GPU 822 into images that can be displayed on a display 826.

Although a specific system for receiving and processing a GPU command stream is conceptually illustrated in FIG. 8, any of a variety of systems, including those which the GPU command stream is sent from the streaming source system to a rendering system, can also be utilized in accordance with an embodiment of the invention.

GPU Command Manipulation Functionalities

In many competitive video games, the view the video gamer has of the video game world is often chosen by the video gamer. In traditional video game streaming, the video gamer, or streamer, streams only what is on the streamer's screen. Viewers download the stream and watch it like any other video stream. In a number of embodiments, GPU command streaming can enable the viewers to interact with the stream and watch videos that are different from the video rendered on the display of the video gamer's system that is generating the stream and/or generated by other rendering systems. When the rendering system receives the GPU command stream, viewers can utilize stream metadata such as identifiers for a set of points or matrices in the stream which represent the view origin, HDAs, and/or HDA hashes within the GPU command stream to provide different functionalities. One such functionality is the control of camera views and angles. For example, the video produced by the GPU command stream streamed from the streaming source system might ordinarily cause the video to be rendered from the same viewpoint as used to render the video displayed to the video gamer playing the video game. The remote viewer can utilize the rendering system and the stream metadata to change the point of view from which the video is rendered from a different point of view such as, but not limited, a closer viewpoint a further viewpoint, a higher viewpoint, a lower viewpoint, and/or the viewpoint of another player.

Another possible functionality is that the viewer can alter the graphics quality of the video that the rendering system will render. Video gamer streamers typically have gaming systems with powerful hardware components that allow them to stream a high quality video. Viewers with lower capacity computer hardware might not be able to render a GPU command stream that produces high quality videos. The reverse could also be true. The streamer might have a sub-optimal system that forces streaming at lower graphical quality. The viewer might have a powerful system capable of rendering a high quality video. By utilizing the different HDAs or HDA hashes to retrieve different HDAs, the rendering system can produce varying graphical quality levels of video and viewers can watch the stream at a graphics quality level that suits their systems. In certain embodiments where the rendering server is an intermediate server, varying levels of video quality can be prepared for viewers to stream by processing the received GPU commands into images and encoding the images at different resolutions and/or maximum bitrates.

Although specific functionalities are discussed above, by processing different HDAs, altering GPU commands, and/or utilizing stream metadata, additional functionality can be achieved by the rendering system, such as (but not limited to) zoom factors and different textures.

Random Access

In the context of video game streams that utilize GPU command streaming, randomly accessing a playback location within a video game stream can present a complexity in that rendering of any specific image within a sequence (i.e. at a particular display time) typically depends on the previous GPU state and GPU command input. In many embodiments, random access capability is achieved by providing a GPU streaming system that can provide a rendering system with information utilized to set up a specific GPU state appropriate to a requested access time. The specific GPU state can then be operated upon by a portion of the stream of GPU commands commencing at the requested access time to render an image. To achieve an appropriate level of random access, GPU state information can be periodically captured. The rendering system can retrieve the GPU state information when the viewer requests, or seeks, a new state. The rendering system GPU can then update according to the GPU state information received and processes the GPU commands necessary to reach the requested state. The requested state can be rendered and displayed to the viewer, satisfying the viewer's request.

Figure 9:
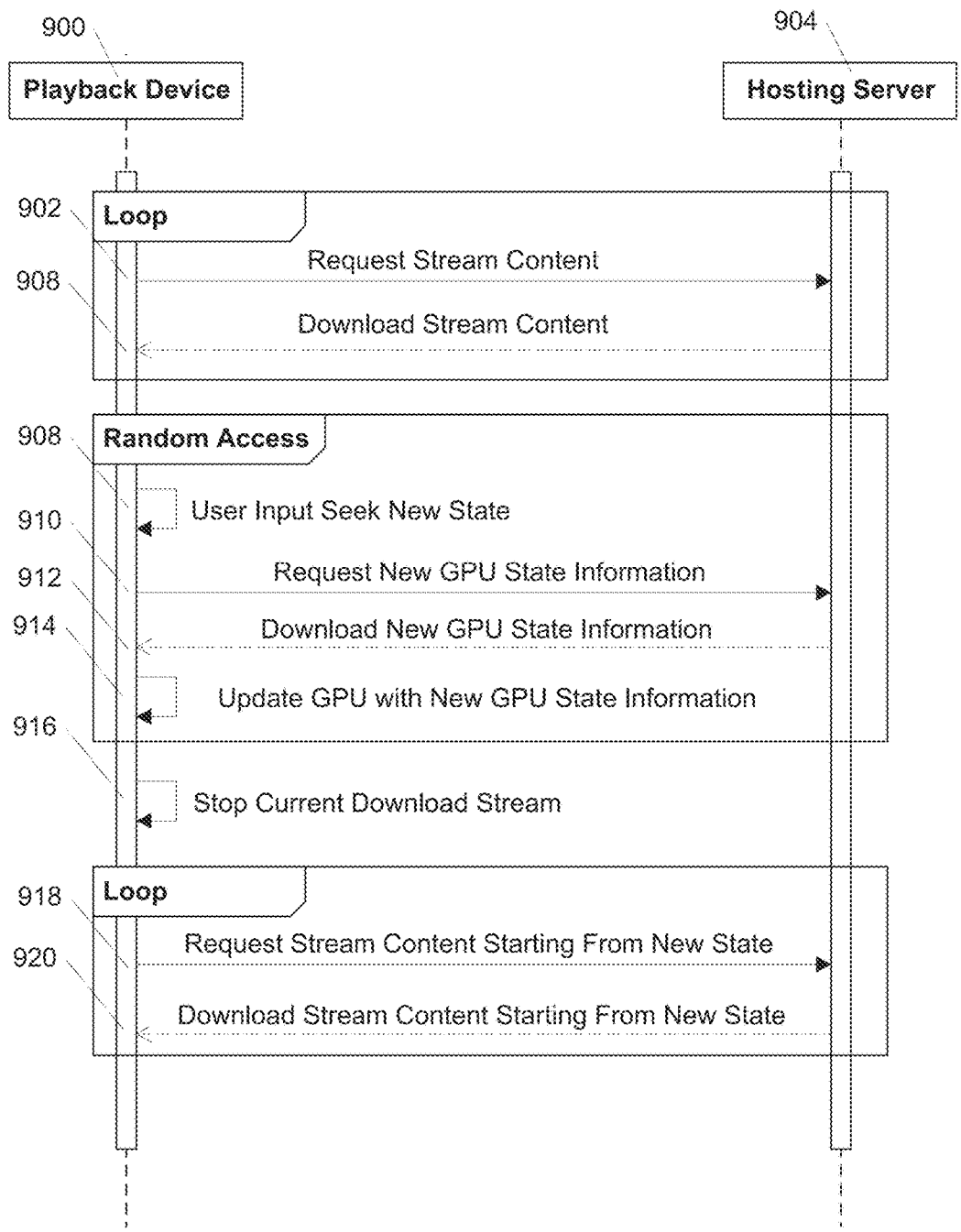
FIG. 9 is a timing diagram of a GPU command streaming system capable of random access in accordance with an embodiment of the invention.

Communication between a playback device and a hosting server when a playback device requests a random access point to a specific playback location in accordance with an embodiment of the invention is illustrated in FIG. 9. During playback, the playback device 900 can be constantly requesting 902 a GPU command stream from the hosting server 904. The hosting server 904 can constantly send 906 the GPU command stream to the playback device 900. When the playback device 900 receives a user input 908 seeking a new state, the playback device 900 can request 910 the new GPU state information from the hosting server 904. The hosting server 904 can send 912 the new GPU state information to the playback device 900. The playback device 900 can use the new GPU state information to update 914 the playback device's GPU. The playback device 900 can achieve this by clearing the current GPU state and update the GPU with the new GPU state information. The GPU can process the new information to the point of the requested new state. The playback device 900 can stop 916 the current download stream from the hosting server 904. The playback device 900 can then start a new continuous loop of requesting 918 and downloading 920 a GPU command stream from the hosting server 904 starting at the new state.

Although a specific system for random access in a GPU command stream is conceptually illustrated in FIG. 9, any of a variety of systems, including those which have a playback device 900 receiving user input requesting a new playback location and requesting and downloading GPU state information from a hosting server 904, can also be utilized in accordance with an embodiment of the invention.

Streaming a GPU Command Stream

Figure 10:
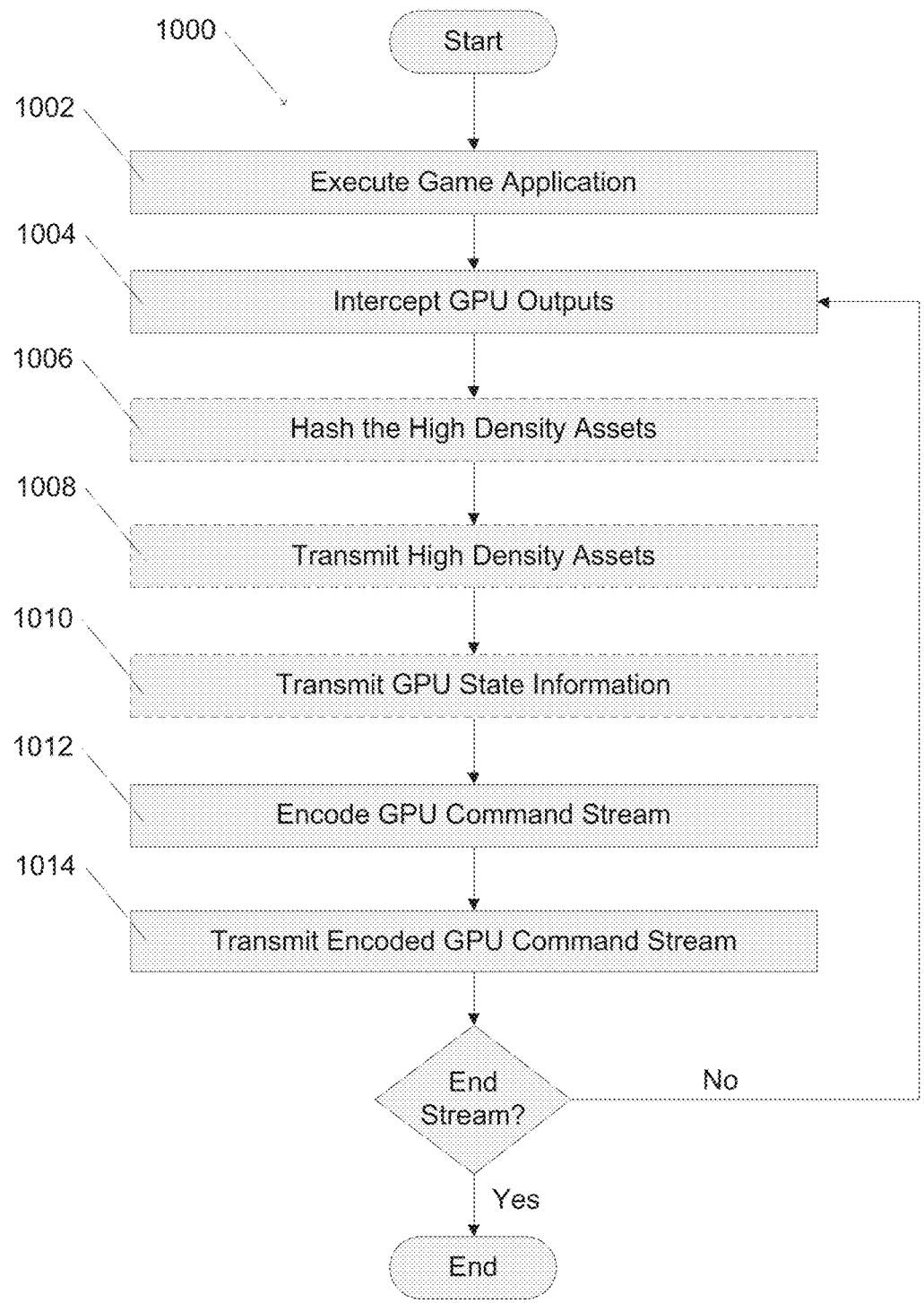
FIG. 10 is a flow chart conceptually illustrating a process for encoding and transmitting a GPU command stream in accordance with an embodiment of the invention.

A process 1000 that can be utilized to encode and send a GPU command stream in accordance with an embodiment of the invention is illustrated in FIG. 10. A game application can be executed (1002) on the streaming source system. Outputs from the streaming source system GPU can be intercepted (1004) before they are sent to the streaming source system GPU for processing. The intercepted outputs can include GPU commands, HDAs, and/or GPU state information. HDAs can optionally be hashed (1006). The HDAs can be hashed using any of a number of hash functions. HDAs can optionally be transmitted (1008). In many embodiments, the HDAs are sent to a hosting server separate from the GPU command stream hosting server. In several embodiments, the HDAs are sent to the same hosting server as the GPU command stream. In some embodiments, the HDAs are part of the GPU command stream. GPU state information can optionally be transmitted (1010). In some embodiments, the GPU state information is transmitted as part of the GPU command stream. In many embodiments, the GPU state information is sent to a hosting server. This hosting server can be the GPU command stream hosting server or a separate server. The rendering system can then request and download specific GPU state information when the rendering system receives a user input requesting a new playback location. A GPU command stream can be encoded (1012). Any of the processes described above for encoding a GPU command stream, such as (but not limited to) serialization and/or compression, can be utilized in accordance with various embodiments of the invention. The GPU command stream can include GPU commands, stream metadata, and/or GPU state information. If the HDAs are not hashed, then the GPU command stream can also include HDAs. If the HDAs are hashed, then the GPU command stream can also include the hashes of the HDAs. The encoded GPU command stream can be transmitted (1014). The encoded GPU command stream can be transmitted to a GPU command stream hosting server. In several embodiments, the encoded GPU command stream can be transmitted to a rendering system.

Although a specific system for encoding and transmitting a GPU command stream is conceptually illustrated in FIG. 10, any of a variety of systems for streaming GPU commands can be utilized as appropriate to the requirements of specific applications in accordance with an embodiment of the invention.

Figure 11:
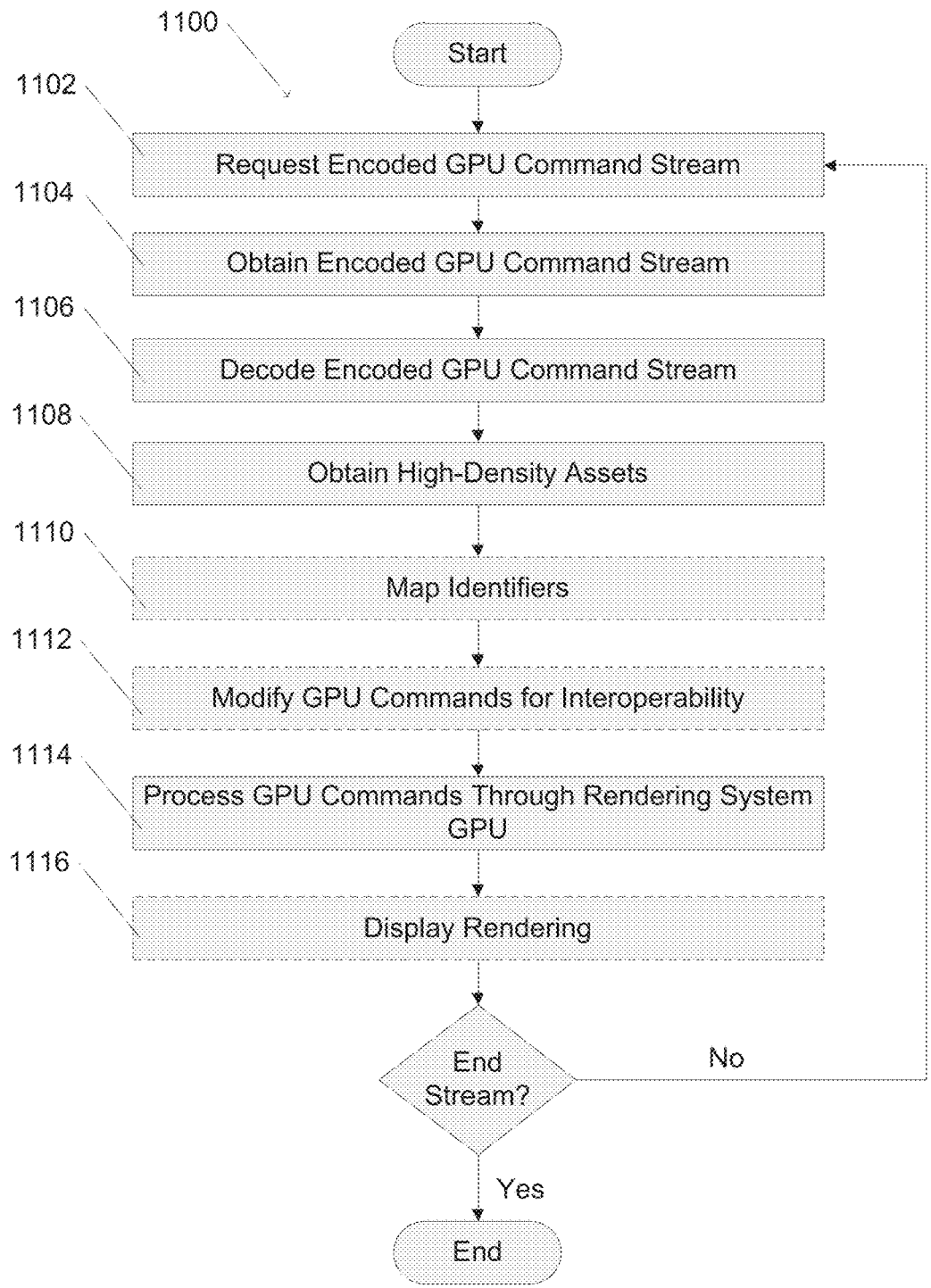
FIG. 11 is a flow chart conceptually illustrating a process for receiving and processing a GPU command stream in accordance with an embodiment of the invention.

A process 1100 that can be utilized by a rendering system to receive and process a GPU command stream in accordance with an embodiment of the invention is illustrated in FIG. 11. An encoded GPU command stream can be requested (1102) by the rendering system. The encoded GPU command stream can be received (1104) by the rendering system. The encoded GPU command stream can be decoded (1106). Any of the processes described above for decoding a GPU command stream, such as (but not limited to) decompression and/or deserialization, can be utilized in accordance with various embodiments of the invention. HDAs can be retrieved (1108). The HDA can be retrieved from a hosting server. In many embodiments, the HDAs are a part of the GPU command stream and are retrieved when the GPU command stream is decoded. In some embodiments, a portion of the HDA is retrieved from a local database. GPU runtime generated identifiers can optionally be mapped (1110) by a software module in the rendering system. GPU commands can optionally be modified (1112) for interoperability by a software module in the rendering system. The software modules for mapping identifiers and modifying GPU commands can be on non-volatile memory of the rendering system. In some embodiments, the software modules are contained in volatile memory. In various embodiments, the software modules can be loaded into the volatile memory at runtime by use of an external or internal storage device. GPU commands can be processed (1114) through the rendering system GPU into rendered images. The rendered images can optionally be displayed (1116) onto a display.

Although a specific system for receiving and processing a GPU command stream is conceptually illustrated in FIG. 11, any of a variety of systems for receiving and processing GPU command streams can be utilized as appropriate to the requirements of specific applications in accordance with an embodiment of the invention.

Although the present invention has been described in certain specific aspects, many additional modifications and variations would be apparent to those skilled in the art. It is therefore to be understood that the present invention may be practiced otherwise than specifically described, including various changes in the implementation such as using intermediate systems as rendering systems, without departing from the scope and spirit of the present invention. Thus, embodiments of the present invention should be considered in all respects as illustrative and not restrictive.

What is claimed is:

1. A method for receiving and processing an encoded graphical processing unit (GPU) command stream, the method comprising:

obtaining an encoded GPU command stream from at least one hosting server system using a rendering system, wherein the rendering system comprises a processor, wherein the encoded GPU command stream is produced by a streaming source system, and wherein the streaming source system is configured to produce a streamed set of images at a streamed quality level;

decoding the encoded GPU command stream into a decoded GPU command stream using the rendering system, wherein the decoded GPU command stream comprises a set of GPU commands and a first set of runtime generated identifiers;

modifying the decoded GPU command stream by altering a subset of the set of GPU commands using the rendering system, wherein the subset of the set of GPU commands comprises GPU commands that are incompatible with the processor of the rendering system and the altered subset of the set of GPU commands comprises GPU commands that are compatible with the processor of the rendering system;

obtaining a set of high density assets using the rendering system, wherein the set of high density assets includes a plurality of versions of high density assets that correspond to a plurality of Quality levels;

mapping the first set of runtime generated identifiers to a second set of runtime generated identifiers using the rendering system so that the second set of runtime generated identifiers is correctly associated with the set of GPU commands; and producing a set of images using the rendering system by processing the modified decoded GPU command stream and the set of high density assets using the processor, wherein the set of high density assets is used to produce the set of images at a rendered quality level different than the streamed quality level, the rendered quality level being one of the plurality of quality levels.

2. The method of claim 1 wherein the processor comprises a GPU.

3. The method of claim 1, wherein decoding the encoded GPU command stream into a decoded GPU command stream using the rendering system comprises:
decompressing the encoded GPU command stream; and
deserializing the decompressed encoded GPU command stream.

4. The method of claim 3, wherein:
the decoded GPU command stream further comprises hashes of high density assets; and
obtaining a set of high density assets using the rendering system comprises using the hashes to obtain the set of high density assets from at least one hosting server system.

5. The method of claim 4, wherein:
the decoded GPU command stream further comprises stream metadata; and
the method further comprising:
altering the decoded GPU command stream using the rendering system by:
receiving a user input; and
modifying the rendering of the set of images based upon the stream metadata in response to the user input.

6. The method of claim 1, wherein:
the decoded GPU command stream further comprises hashes of high density assets; and
obtaining a set of high density assets using the rendering system comprises:
determining a first subset of the set of high density assets exists in a local database by using the hashes to perform a lookup;
obtaining the first subset of the set of high density assets from the local database; and
using the hashes to obtain a second subset of the set of high density assets from at least one hosting server system.

7. The method of claim 1, further comprising:
receiving a user input requesting a new playback location using the rendering system;
obtaining a set of new state information using the rendering system, where the set of new state information is obtained based upon the new playback location; and
updating the processor with the set of new state information using the rendering system.

8. A method for encoding and transmitting a GPU command stream to a rendering system comprising a rendering system processor, the method comprising:
intercepting GPU outputs from a GPU using a streaming source system, wherein the streaming source system is configured to produce a streamed set of images at a streamed quality level, and the GPU outputs comprise GPU commands and high density assets produced by the streaming source system, wherein the set of high density assets includes a plurality of versions of high density assets that correspond to a plurality of quality levels, and wherein the rendering system is configured to modify the GPU commands that are not supported by the rendering system processor into equivalent GPU commands that are compatible with the rendering system processor, and to produce using the high density assets a rendered set of images at a rendered quality level different than the streamed quality level, the rendered quality level being one of the plurality of quality levels;
hashing the high density assets using the streaming source system by using a hashing function, the hashing producing hashes of the high density assets;
transmitting high density assets to at least one hosting server system using the streaming source system;
encoding the hashes of the high density assets and a subset of the GPU outputs into an encoded GPU command stream using the streaming source system; and
transmitting the encoded GPU command stream to the at least one hosting server system using the streaming source system.

9. The method of claim 8, wherein encoding the hashes of the high density assets and a subset of the GPU outputs into an encoded GPU command stream using the streaming source system comprises:
serializing the hashes of the high density assets and the subset of the GPU outputs; and
compressing the serialized hashes of the high density assets and subset of the GPU outputs.

10. A rendering system for receiving and processing a GPU command stream, the rendering system comprising:
a set of processors;
memory containing a rendering engine application;
a network interface;
an input device;
wherein the rendering engine application directs the set of processors to:
obtain an encoded GPU command stream from at least one hosting server system using the network interface, wherein the encoded GPU command stream is produced by a streaming source system, and wherein the streaming source system is configured to produce a streamed set of images at a streamed quality level;
decode the encoded GPU command stream into a decoded GPU command stream, wherein the decoded GPU command stream comprises a set of GPU commands and a first set of runtime generated identifiers;
modify the decoded GPU command stream by altering a subset of the set of GPU commands using the rendering system, wherein the subset of the set of GPU commands comprises GPU commands that are incompatible with the set of processors of the rendering system and the altered subset of the set of GPU commands comprises GPU commands that are compatible with the set of processors of the rendering system;
obtain a set of high density assets using the network interface, wherein the set of high density assets includes a plurality of versions of high density assets that correspond to a plurality of quality levels;
map the first set of runtime generated identifiers to a second set of runtime generated identifiers so that the second set of runtime generated identifiers is correctly associated with the set of GPU commands; and
produce a set of images by processing the modified decoded GPU command stream and the set of high density assets using the set of processors, wherein the set of high density assets is used to produce the set of images at a rendered quality level different than the streamed quality level, the rendered quality level being one of the plurality of quality levels.

11. The rendering system of claim 10 wherein the set of processors is selected from the group consisting of:
at least one central processing unit (CPU); and
at least one CPU and at least GPU.

12. The rendering system of claim 10, wherein decoding the encoded GPU command stream into a decoded GPU command stream comprises:

decompressing the encoded GPU command stream; and
deserializing the decompressed encoded GPU command stream.

13. The rendering system of claim 12, wherein:
the decoded GPU command stream further comprises hashes of high density assets; and
obtaining a set of high density assets using the network interface comprises using the hashes to obtain the set of high density assets from at least one hosting server system.

14. The rendering system of claim 13, wherein:
the decoded GPU command stream further comprises stream metadata; and
the rendering engine application further directs the set of processors to:
    alter the decoded GPU command stream by:
        receiving a user input; and
        modifying the rendering of the set of images based upon the stream metadata in response to the user input.

15. The rendering system of claim 10, wherein:
the decoded GPU command stream further comprises hashes of high density assets; and
obtaining a set of high density assets using the network interface comprises:
    determining a first subset of the set of high density assets exists in a local database by using the hashes to perform a lookup;
    obtaining the first subset of the set of high density assets from the local database; and
    using the hashes to obtain a second subset of the set of high density assets from at least one hosting server system.

16. The rendering system of claim 10, wherein the rendering engine application further directs the set of processors to:
    receive a user input requesting a new playback location using the input device;
    obtain a set of new state information using the network interface, where the set of new state information is obtained based upon the new playback location; and
    update the second subset of the set of processors with the set of new state information.

17. A streaming source system for encoding and transmitting a GPU command stream to a rendering system comprising a rendering system processor, the streaming source system comprising:
    a set of processors;
    memory containing a streaming application;
    a network interface; wherein the streaming application directs a set of processors to: intercept GPU outputs from a GPU,
    wherein the streaming source system is configured to produce a streamed set of images at a streamed quality level, and the GPU outputs comprise GPU commands and high density assets produced by the streaming source system, wherein the set of high density assets includes a plurality of versions of high density assets that correspond to a of plurality of quality levels, and wherein the rendering system is configured to modify the GPU commands that are not supported by the rendering system processor into equivalent GPU commands that are compatible with the rendering system processor, and to produce using the high density assets a rendered set of images at a rendered quality level different than the streamed quality level, the rendered quality level being one of the plurality of quality levels;
    hash the high density assets using a hashing function, the hashing producing hashes of the high density assets;
    transmit high density assets to at least one hosting server system using the network interface;
    encode the hashes of the high density assets and a subset of the GPU outputs into an encoded GPU command stream; and
    transmit the encoded GPU command stream to the at least one hosting server system using the network interface.

18. The streaming source system of claim 17, wherein encoding the hashes of the high density assets and a subset of the GPU outputs into an encoded GPU command stream comprises:
    serializing the hashes of the high density assets and the subset of the GPU outputs; and
    compressing the serialized hashes of the high density assets and subset of the GPU outputs.

* * * * *